(12) United States Patent
Feng et al.

(10) Patent No.: US 11,689,655 B2
(45) Date of Patent: Jun. 27, 2023

(54) METHOD FOR ADJUSTING PARAMETER OF AUDIO SERVICE AND TERMINAL

(71) Applicant: Huawei Technologies Co., Ltd., Shenzhen (CN)

(72) Inventors: Jianhua Feng, Shanghai (CN); Jianting Feng, Shanghai (CN); Shi Zhang, Shanghai (CN); Hongjun Zhao, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 17/285,199

(22) PCT Filed: Oct. 15, 2018

(86) PCT No.: PCT/CN2018/110305
§ 371 (c)(1),
(2) Date: Apr. 14, 2021

(87) PCT Pub. No.: WO2020/077510
PCT Pub. Date: Apr. 23, 2020

(65) Prior Publication Data
US 2021/0329123 A1    Oct. 21, 2021

(51) Int. Cl.
*H04M 1/73* (2006.01)
*H04R 3/00* (2006.01)

(52) U.S. Cl.
CPC ............. *H04M 1/73* (2013.01); *H04R 3/00* (2013.01); *H04R 2430/01* (2013.01)

(58) Field of Classification Search
CPC ............. H04M 1/73; H04M 2250/12; H04M 1/72454; H04M 1/72433; H04R 3/00; H04R 2430/01; H04R 29/00; H04R 29/001; H04R 29/002; H04R 29/007; Y02D 30/70; H04W 52/0251
USPC .................... 381/58, 104–107, 109
See application file for complete search history.

(56) References Cited

U.S. PATENT DOCUMENTS

| | | | | |
|---|---|---|---|---|
| 7,840,015 B1 * | 11/2010 | Melanson | ............. | H03F 3/2175 330/10 |
| 9,826,305 B2 * | 11/2017 | Tu | ......................... | H04R 29/001 |
| 2005/0244014 A1 * | 11/2005 | Elko | ...................... | G01K 11/22 381/59 |
| 2010/0226509 A1 * | 9/2010 | Filson | .................... | G04B 37/02 381/105 |

(Continued)

FOREIGN PATENT DOCUMENTS

| CN | 104065835 A | 9/2014 |
|---|---|---|
| CN | 104735248 A | 6/2015 |

(Continued)

*Primary Examiner* — Xu Mei
(74) *Attorney, Agent, or Firm* — Conley Rose, P.C.

(57) ABSTRACT

A method for adjusting a parameter of an audio service and a terminal includes obtaining, by the terminal, first information, where the first information includes at least one of a first battery level or a first temperature, and adjusting, by the terminal, a parameter of an audio service of the terminal when a first condition is met, where the first condition includes one or more of the first battery level is less than a first preset threshold or greater than a second preset threshold, or the first temperature is less than a third preset threshold or greater than a fourth preset threshold.

20 Claims, 4 Drawing Sheets

(56) References Cited

U.S. PATENT DOCUMENTS

| | | | |
|---|---|---|---|
| 2011/0110534 A1* | 5/2011 | Lindahl | G06F 3/04883 |
| | | | 381/107 |
| 2012/0042107 A1 | 2/2012 | Rabii | |
| 2012/0177226 A1* | 7/2012 | Silverstein | G06F 1/325 |
| | | | 381/107 |
| 2012/0250889 A1* | 10/2012 | Millett | H03G 3/3026 |
| | | | 381/107 |
| 2012/0328117 A1* | 12/2012 | Gautama | H03G 7/002 |
| | | | 381/59 |
| 2014/0003630 A1* | 1/2014 | Demiya | H03G 5/165 |
| | | | 381/107 |
| 2015/0181531 A1 | 6/2015 | Zajac | |
| 2016/0088563 A1 | 3/2016 | Koo et al. | |
| 2018/0152785 A1* | 5/2018 | Yeoh | H03F 1/0216 |

FOREIGN PATENT DOCUMENTS

| | | | |
|---|---|---|---|
| CN | 105684525 A | 6/2016 | |
| CN | 106125880 A | 11/2016 | |
| CN | 107155001 A | 9/2017 | |
| CN | 107404753 A | 11/2017 | |
| CN | 107426438 A | 12/2017 | |
| CN | 107681993 A | 2/2018 | |
| CN | 108267972 A | 7/2018 | |
| EP | 2911376 A1 | 8/2015 | |

* cited by examiner

METHOD FOR ADJUSTING PARAMETER OF AUDIO SERVICE AND TERMINAL

CROSS-REFERENCE TO RELATED APPLICATIONS

This application is a U.S. National Stage of International Patent Application No. PCT/CN2018/110305 filed on Oct. 15, 2018, which is hereby incorporated by reference in its entirety.

TECHNICAL FIELD

This application relates to the communications field, and in particular, to a method for adjusting a parameter of an audio service and a terminal.

BACKGROUND

Currently in the market, terminals (for example, mobile phones) become increasingly multifunctional, and there is an increasing quantity of functions. An audio service (calling, an incoming call, music, a video, or the like) is always a most basic and most important function of the terminals as communications devices.

When a terminal runs the audio service in a low-temperature or low-battery scenario, an internal resistance of a battery deteriorates (an impedance increases) due to a low temperature or a low battery level. In addition, because a transient current crest (a maximum transient current value) of the audio service is the largest among service application scenarios of the terminal (for example, the transient current crest of the audio service may reach 7 A, and a transient current crest in another scenario is 4 A to 5 A), an actual output capability of the battery is greatly reduced. As a result, the terminal is powered off or restarted.

SUMMARY

Embodiments of this application provide a method for adjusting a parameter of an audio service and a terminal, which can resolve a problem that a terminal is powered off or restarted when the terminal runs an audio service in a low-temperature or low-battery scenario.

According to a first aspect, an embodiment of this application provides a method for adjusting a parameter of an audio service. The method includes: A terminal obtains first information, where the first information includes at least one of a first battery level and a first temperature; and the terminal adjusts a parameter of an audio service of the terminal if a first condition is met, where the first condition includes one or more of the following cases: The first battery level is less than a first preset threshold or greater than a second preset threshold, and the first temperature is less than a third preset threshold or greater than a fourth preset threshold.

In this way, if the first battery level is less than the first preset threshold or greater than the second preset threshold, and/or the first temperature is less than the third preset threshold or greater than the fourth preset threshold, the terminal may adjust the parameter of the audio service of the terminal. This ensures that power-off or restart of the terminal is not triggered in a low-temperature or low-battery scenario.

In a possible implementation, the parameter of the audio service includes at least one of volume and a sound effect. Adjusting the volume may be adjusting loudness (value) of a sound. Adjusting the sound effect may be adjusting at least one of a proportion of a low-frequency sound, a proportion of an intermediate-frequency sound, and a proportion of a high-frequency sound.

In a possible design, if the first battery level is less than the first preset threshold, and/or the first temperature is less than the third preset threshold, the terminal switches a working mode of the audio service from a normal mode to a low-power mode. Volume and/or a sound effect of the audio service in the low-power mode are/is lower than volume and/or a sound effect of the audio service in the normal mode. In this way, objectives such as power consumption reduction (battery life extension), current reduction, and speaker protection can be achieved in a low-temperature or low-battery scenario, and power-off or restart is not triggered. If the first battery level is greater than the second preset threshold, and/or the first temperature is greater than the fourth preset threshold, the terminal switches the working mode of the audio service from the low-power mode to the normal mode, so that user experience can be improved.

In a possible implementation, that the terminal adjusts a parameter of an audio service of the terminal if a first condition is met includes: If the first battery level is less than the first preset threshold, and/or the first temperature is less than the third preset threshold, the terminal performs first processing, where the first processing includes at least one of the following: decreasing the volume and reducing the sound effect. Decreasing the volume may be decreasing loudness of a sound, and reducing the sound effect may be reducing a proportion of a low-frequency sound. If the first battery level is greater than the second preset threshold, and/or the first temperature is greater than the fourth preset threshold, the terminal performs second processing, where the second processing includes at least one of the following: increasing the volume and improving the sound effect. Increasing the volume may be increasing loudness of a sound, and improving the sound effect may be increasing a proportion of a low-frequency sound.

In a possible implementation, that a terminal obtains first information includes: The terminal performs polling on a battery level and/or temperature information of the terminal. For example, the terminal may perform polling on the battery level and/or the temperature information of the terminal once every 1 s by using an Android package (android package, APK) message.

According to a second aspect, an embodiment of the present invention provides a terminal. The terminal includes: an obtaining unit, configured to obtain first information, where the first information includes at least one of a first battery level and a first temperature; and an adjustment unit, configured to adjust a parameter of an audio service of the terminal if a first condition is met, where the first condition includes one or more of the following cases: The first battery level is less than a first preset threshold or greater than a second preset threshold, and the first temperature is less than a third preset threshold or greater than a fourth preset threshold.

In a possible implementation, the parameter of the audio service includes at least one of volume and a sound effect.

In a possible implementation, the adjustment unit is configured to: if the first battery level is less than the first preset threshold, and/or the first temperature is less than the third preset threshold, switch a working mode of the audio service from a normal mode to a low-power mode; and if the first battery level is greater than the second preset threshold, and/or the first temperature is greater than the fourth preset threshold, switch the working mode of the audio service from the low-power mode to the normal mode. Volume and/or a sound effect of the audio service in the low-power mode are/is lower than volume and/or a sound effect of the audio service in the normal mode.

In a possible implementation, the adjustment unit is configured to: if the first battery level is less than the first preset threshold, and/or the first temperature is less than the third preset threshold, perform first processing, where the first processing includes at least one of the following: decreasing the volume and reducing the sound effect; and if the first battery level is greater than the second preset threshold, and/or the first temperature is greater than the fourth preset threshold, perform second processing, where the second processing includes at least one of the following: increasing the volume and improving the sound effect.

In a possible implementation, the obtaining unit is configured to perform polling on a battery level and/or temperature information of the terminal.

According to a third aspect, an embodiment of the present invention provides an apparatus. The apparatus exists in a product form of a chip. A structure of the apparatus includes a processor and a memory. The memory is configured to be coupled to the processor and store a program instruction and data that are necessary for the apparatus. The processor is configured to execute the program instruction stored in the memory, so that the apparatus performs functions of the terminal in the foregoing method.

According to a fourth aspect, an embodiment of the present invention provides a terminal. The terminal may implement functions performed by the terminal in the foregoing method embodiment. The functions may be implemented by hardware, or may be implemented by hardware executing corresponding software. The hardware or the software includes one or more modules corresponding to the foregoing functions.

In a possible design, a structure of the terminal includes a processor and a communications interface. The processor is configured to support the terminal in performing corresponding functions in the foregoing method. The communications interface is configured to support communication between the terminal and another network element. The terminal may further include a memory. The memory is configured to be coupled to the processor, and the memory stores a program instruction and data that are necessary for the terminal.

According to a fifth aspect, an embodiment of the present invention provides a computer readable storage medium, including an instruction. When the instruction runs on a computer, the computer is enabled to perform any method provided in the first aspect.

According to a sixth aspect, an embodiment of the present invention provides a computer program product including an instruction. When the computer program product runs on a computer, the computer is enabled to perform any method provided in the first aspect.

DESCRIPTION OF EMBODIMENTS

A method for adjusting a parameter of an audio service provided in an embodiment of this application may be applied to a terminal. The method can avoid restart or power-off of the terminal in a special or extreme scenario (for example, a low-temperature or low-battery scenario), and can achieve objectives such as power consumption reduction, current reduction, and speaker protection.

For example, the terminal may be a device such as a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, or a smartwatch. The terminal may alternatively be a mobile phone 100 shown in FIG. 1. A specific form of the terminal is not particularly limited in this embodiment of this application.

Figure 1:
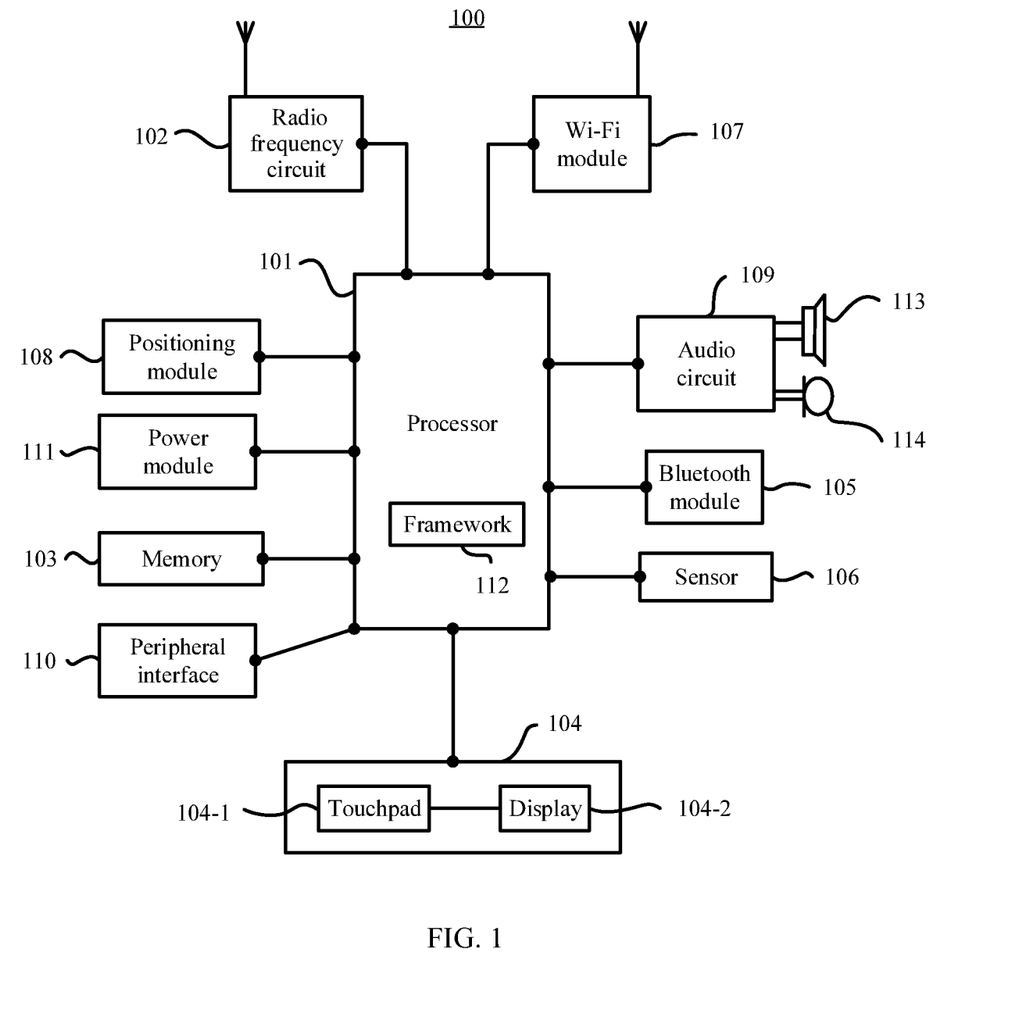
FIG. 1 is a schematic structural diagram of a terminal according to an embodiment of this application.

As shown in FIG. 1, the terminal in this embodiment of this application may be the mobile phone 100. The following describes the embodiment in detail by using the mobile phone 100 as an example. It may be understood that the mobile phone 100 shown in the figure is merely an example of the terminal. The mobile phone 100 may have more or fewer components than those shown in the figure, may combine two or more components, or may have different component configurations. Various components shown in the figure may be implemented by hardware that includes one or more signal processing or application-specific integrated circuits, software, or a combination of hardware and software.

As shown in FIG. 1, the mobile phone 100 may specifically include components such as a processor 101, a radio frequency (radio frequency, RF) circuit 102, a memory 103, a touchscreen 104, a Bluetooth module 105, one or more sensors 106, a wireless fidelity (wireless fidelity, Wi-Fi) module 107, a positioning module 108, an audio circuit 109, a peripheral interface 110, and a power module 111. These components may communicate by using one or more communications buses or signal cables (not shown in FIG. 1). A person skilled in the art may understand that a hardware structure shown in FIG. 1 does not constitute a limitation on the mobile phone 100. The mobile phone 100 may include more or fewer components than those shown in the figure, combine some components, or have different component arrangements.

The following describes each component of the mobile phone 100 in detail with reference to FIG. 1.

The processor 101 is a control center of the mobile phone 100, and is connected to each part of the mobile phone 100 by using various interfaces and lines. The processor 101 performs various functions of the mobile phone 100 and processes data by running or executing an application program stored in the memory 103 and invoking data and an instruction stored in the memory 103. In some embodiments, the processor 101 may include one or more processing units. The processor 101 may further integrate an application processor and a modem processor. The application processor mainly processes an operating system, a user interface, an application program, and the like. The modem processor mainly processes wireless communication. It may be understood that the modem processor may alternatively not be integrated into the processor 101. For example, the processor 101 may be a Kirin 960 multi-core processor manufactured by Huawei Technologies Co., Ltd.

The radio frequency circuit 102 may be configured to receive and send a radio signal in a process of receiving and sending information or a call process. Specifically, after receiving downlink data of a base station, the radio frequency circuit 102 may send the downlink data to the processor 101 for processing. In addition, the radio frequency circuit 102 sends uplink data to the base station. Generally, the radio frequency circuit includes but is not limited to an antenna, at least one amplifier, a transceiver, a coupler, a low noise amplifier, and a duplexer. In addition, the radio frequency circuit 102 may further communicate with another device through wireless communication. The wireless communication may use any communication standard or protocol, including but not limited to global system for mobile communications, general packet radio service, code division multiple access, wideband code division multiple access, long term evolution, email, and short message service.

The memory 103 is configured to store an application program and data. The processor 101 performs various functions of the mobile phone 100 and processes data by running the application program and the data that are stored in the memory 103. The memory 103 mainly includes a program storage area and a data storage area. The program storage area may store an operating system and an application program required by at least one function (such as a sound play function and an image display function). The data storage area may store data (such as audio data and a phone book) created when the mobile phone 100 is used. In addition, the memory 103 may include a high-speed random access memory, and may further include a nonvolatile memory, for example, a magnetic disk storage device and a flash memory device, or may include another volatile solid-state storage device. The memory 103 may store various operating systems, for example, an iOS® operating system developed by Apple Inc. and an Android® operating system developed by Google Inc.

The touchscreen 104 may include a touch-sensitive surface 104-1 and a display 104-2.

The touch-sensitive surface 104-1 (for example, a touch panel) may collect a touch event performed by a user of the mobile phone 100 on or near the touch-sensitive surface 104-1 (for example, an operation performed by the user on the touch-sensitive surface 104-1 or near the touch-sensitive surface 104-1 by using any suitable object such as a finger or a stylus), and send collected touch information to another device such as the processor 101.

The touch event performed by the user near the touch-sensitive surface 104-1 may be referred to as a floating touch. The floating touch may mean that the user does not need to directly touch the touch panel to select, move, or drag a target (for example, an icon), and the user only needs to be located near the terminal to perform a desired function. In a floating touch application scenario, terms such as "touch" and "contact" do not imply direct contact with the touchscreen, but contact in a vicinity of or near the touchscreen. The touch-sensitive surface 104-1 on which the floating touch can be performed may be implemented by using a capacitive type, an infrared light sensing type, an ultrasonic wave type, or the like. The touch-sensitive surface 104-1 may include two parts: a touch detection module and a touch controller. The touch detection module detects a touch direction of the user, detects a signal brought by a touch operation, and sends the signal to the touch controller. The touch controller receives touch information from the touch detection module, converts the touch information into touch point coordinates, and then sends the touch point coordinates to the processor 101. The touch controller may further receive and execute an instruction sent by the processor 101. In addition, the touch-sensitive surface 104-1 may be implemented by using a plurality of types such as a resistive type, a capacitive type, an infrared type, and a surface acoustic wave type.

The display (also referred to as a display screen) 104-2 may be configured to display information entered by the user or information provided for the user, and various menus of the mobile phone 100. The display 104-2 may be configured in a form of a liquid crystal display, an organic light-emitting diode, or the like. The touch-sensitive surface 104-1 may be overlaid on the display 104-2. After detecting a touch event on or near the touch-sensitive surface 104-1, the touch-sensitive surface 104-1 transfers the touch event to the processor 101 to determine a type of the touch event. Then, the processor 101 may provide a corresponding visual output on the display 104-2 based on the type of the touch event. In FIG. 1, the touch-sensitive surface 104-1 and the display 104-2 are used as two independent components to implement input and output functions of the mobile phone 100. However, in some embodiments, the touch-sensitive surface 104-1 and the display 104-2 may be integrated to implement the input and output functions of the mobile phone 100. It may be understood that the touchscreen 104 is formed by stacking a plurality of layers of materials. In this embodiment of this application, only the touch-sensitive surface (layer) and the display screen (layer) are shown, and other layers are not recorded in this embodiment of this application. In addition, in some other embodiments of this application, the touch-sensitive surface 104-1 may be overlaid on the display 104-2, and a size of the touch-sensitive surface 104-1 is greater than a size of the display 104-2, so that the display 104-2 is completely overlaid by the touch-sensitive surface 104-1. Alternatively, the touch-sensitive surface 104-1 may be configured on a front facet of the mobile phone 100 in a full panel form. To be specific, all touches of the user on the front facet of the mobile phone 100 can be sensed by the mobile phone. In this way, full touch experience of the front facet of the mobile phone can be implemented. In some other embodiments, the touch-sensitive surface 104-1 is configured on the front facet of the mobile phone 100 in the full panel form, and the display 104-2 may also be configured on the front facet of the mobile phone 100 in the full panel form. In this way, a bezel-less structure can be implemented on the front facet of the mobile phone. In some other embodiments of this application, the touchscreen 104 may further include one or more groups of sensor arrays. In this case, when sensing a touch event performed by the user on the touchscreen 104, the touchscreen 104 can also sense pressure applied by the user on the touchscreen 104, and the like.

The mobile phone 100 may further include the Bluetooth module 105 that is configured to implement data exchange between the mobile phone 100 and another short-distance terminal (for example, a mobile phone or a smartwatch). The Bluetooth module in this embodiment of this application may be an integrated circuit, a Bluetooth chip, or the like.

The mobile phone 100 may further include at least one type of sensor 106, for example, a light sensor, a motion sensor, and another sensor. Specifically, the light sensor may include an ambient light sensor and a proximity sensor. The ambient light sensor may adjust luminance of the display of the touchscreen 104 based on brightness of ambient light. The proximity sensor may power off the display when the mobile phone 100 moves to an ear. As a type of motion sensor, an accelerometer sensor may detect a magnitude of acceleration in each direction (generally three axes), and may detect a magnitude and a direction of gravity in a static state. The accelerometer sensor may be used in an application that identifies a posture of a mobile phone (such as landscape or portrait orientation switching, a related game, or magnetometer posture calibration), a function related to vibration identification (such as a pedometer or knocking), and the like. Other sensors such as a fingerprint recognition device, a gyroscope, a barometer, a hygrometer, a thermometer, an electricity meter, and an infrared sensor that may be further configured in the mobile phone 100 are not described herein.

The Wi-Fi module 107 is configured to provide the mobile phone 100 with network access that complies with a Wi-Fi-related standard protocol. The mobile phone 100 may be connected to a Wi-Fi access point by using the Wi-Fi module 107, and then help the user receive and send an email, browse a web page, access streaming media, and the like. The Wi-Fi module 107 provides the user with wireless broadband Internet access. In some other embodiments, the Wi-Fi module 107 may also be used as a Wi-Fi wireless access point, and may provide Wi-Fi network access for another terminal.

The positioning module 108 is configured to provide a geographical location for the mobile phone 100. It may be understood that the positioning module 108 may be specifically a receiver of a positioning system such as a global positioning system (global positioning system, GPS) or a BeiDou navigation satellite system. After receiving a geographical location sent by the foregoing positioning system, the positioning module 108 sends the information to the processor 101 for processing, or sends the information to the memory 103 for storage. In some other embodiments, the positioning module 108 may be a receiver of an assisted global positioning system (assisted global positioning system, AGPS). The AGPS is an operation manner in which GPS positioning is performed with some assistance. By using a signal of a base station in conjunction with a GPS satellite signal, the positioning module 108 may enable a faster positioning speed for the mobile phone 100. In the AGPS system, the positioning module 108 may obtain positioning assistance by communicating with an assisted positioning server (for example, a mobile phone positioning server). The AGPS system is used as an assisted server to assist the positioning module 108 in completing ranging and positioning services. In this case, the assisted positioning server provides positioning assistance by communicating with the positioning module 108 (that is, a GPS receiver) of the terminal such as the mobile phone 100 by using a wireless communications network.

The audio circuit 109, a speaker 113, and a microphone 114 may provide an audio interface between the user and the mobile phone 100. The audio circuit 109 may convert received audio data into an electrical signal and send the electrical signal to the speaker 113, and the speaker 113 converts the electrical signal into a sound signal for output. On the other hand, the microphone 114 converts a collected sound signal into an electrical signal; and after receiving the electrical signal, the audio circuit 109 converts the electrical signal into audio data, and then outputs the audio data to the RF circuit 102 so that the audio data can be sent to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identity module card). For example, the mobile phone 100 is connected to a mouse by using a universal serial bus interface, and is electrically connected, by using a metal contact on a card slot for a subscriber identity module card (subscriber identity module, SIM), to a subscriber identity module card provided by a telecommunications operator. The peripheral interface 110 may be configured to couple the foregoing external input/output peripheral device to the processor 101 and the memory 103.

The mobile phone 100 may further include the power module 111 (such as a battery and a power management integrated circuits) that supplies power to each component. The battery may be logically connected to the processor 101 by using the power management integrated circuits, to implement functions such as charging management, discharging management, and power consumption management by using the power module 111.

Although not shown in FIG. 1, the mobile phone 100 may further include a camera, a camera flash, a micro projection module, a near field communication (near field communication, NFC) module, and the like. Details are not described herein.

Still as shown in FIG. 1, a framework 112 may be integrated into the processor 101. The framework 112 refers to a processing module that has a temperature determining capability, a battery level determining capability, and a function of processing a plurality of types of data in parallel. Certainly, the framework 112 may not be integrated into the processor 101, and is connected to the processor 101 in an independent entity form.

In this embodiment of this application, the framework 112 may perform determining on a battery level obtained by an electricity meter and a preset threshold (a first preset threshold or a second preset threshold), and may perform determining on a temperature obtained by the sensor 106 and a preset threshold (a third preset threshold or a fourth preset threshold). Then the framework 112 determines whether a first condition is met, so as to determine whether to adjust a parameter of an audio service of the terminal.

Figure 2:
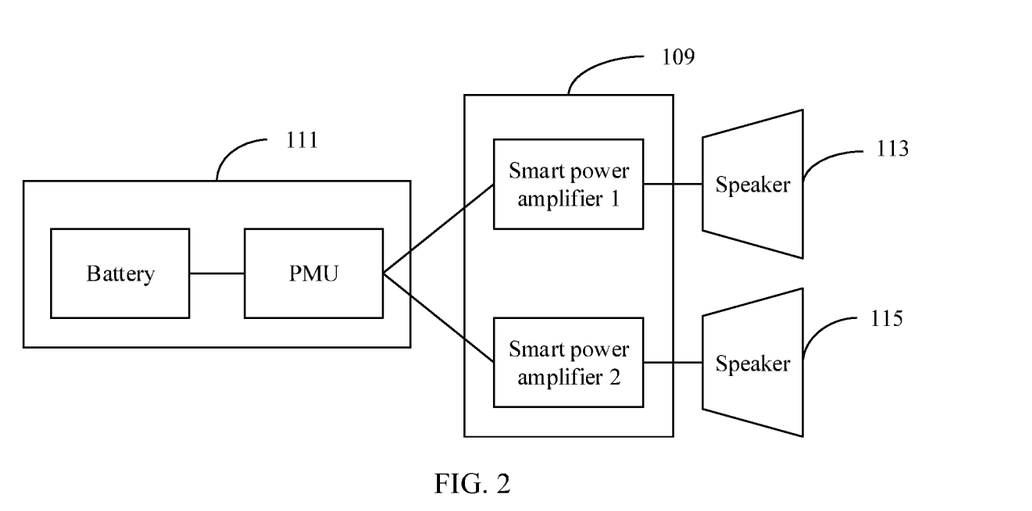
FIG. 2 is a schematic architectural diagram of a power module, an audio circuit, and a speaker according to an embodiment of this application.

For example, FIG. 2 is a schematic architectural diagram of the power module 111, the audio circuit 109, and the speaker 113 of the mobile phone 100 shown in FIG. 1. The power module 111 may include a battery and a power management unit (power management unit, PMU). The audio circuit 109 may be of a dual smart power amplifier (smart power amplifier, Smart PA) architecture (including a smart power amplifier 1 and a smart power amplifier 2). The audio circuit 109 may be connected to a plurality of speakers (for example, the speaker 113 and a speaker 115). It should be noted that, in the architecture shown in FIG. 2, a continuous output capability of the battery at a normal temperature (for example, at a temperature between 10° C. and 25° C.) is comparatively stable, which can ensure continuous normal running of the audio service and avoid a problem such as power-off or restart. When a temperature is low (for example, when the temperature is between −30° C.

and 0° C.), an internal resistance (Rb) of the battery increases sharply. As a result, an overall battery voltage drops more sharply in a discharge current condition the same as that at the normal temperature, and an actual output capability is reduced rapidly. The problem that the mobile phone is immediately powered off or restarted may occur, which greatly affects user experience and a low-temperature feature of a brand. For example, Vsys=Vbat−Ibat×Rb, where Vsys is a power-off threshold voltage, Vbat is a battery voltage, I is a current, and Rb is a resistance (mainly including an internal resistance of a battery). If Vsys remains less than 2.6 V for 80 ms or more, or Vsys is less than 2.3 V, the PMU is directly powered off.

This application provides a method for adjusting a parameter of an audio service and an apparatus, so that a terminal can adaptively determine a low-battery or low-temperature environment, and adaptively switch or adjust a parameter of an audio service. Therefore, the problem of power-off or restart of the audio service in a low-battery or low-temperature scenario can be resolved, and a mobile phone can work normally.

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, unless otherwise specified, "at least one" means one or more, and "a plurality of" means two or more. In addition, to clearly describe the technical solutions in the embodiments of this application, words such as "first" and "second" are used in the embodiments of this application to distinguish between same items or similar items whose functions and roles are basically the same. A person skilled in the art may understand that the words such as "first" and "second" do not limit a quantity and an execution sequence, and the words such as "first" and "second" also do not limit that items are definitely different.

It should be noted that, in the embodiments of the present invention, "of (of)", "corresponding and relevant (corresponding and relevant)", and "corresponding (corresponding)" may be mixed sometimes. It should be noted that, when a difference thereof is not emphasized, meanings to be expressed are consistent.

Figure 3:
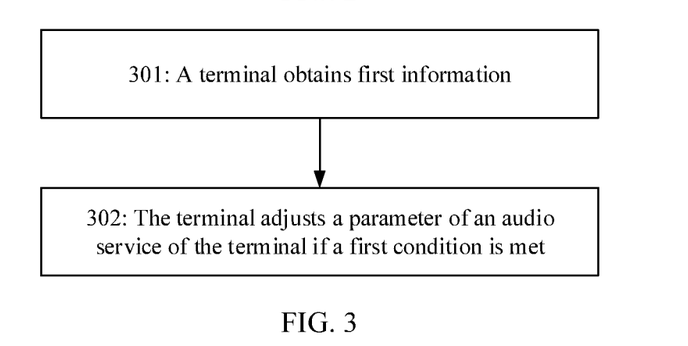
FIG. 3 is a schematic flowchart of a method for adjusting a parameter of an audio service according to an embodiment of this application.

An embodiment of this application provides a method for adjusting a parameter of an audio service. As shown in FIG. 3, the method includes the following steps.

301: A terminal obtains first information, where the first information includes at least one of a first battery level and a first temperature.

The terminal monitors a battery level and/or temperature information of the terminal in real time. For example, the terminal may perform polling on the battery level and/or the temperature information of the terminal once every 1 s by using an APK message.

For example, the temperature information of the terminal may be obtained by a temperature sensor (for example, a thermistor-type temperature sensor) of the terminal, and the battery level of the terminal may be obtained by an electricity meter of the terminal. This is not limited in this application.

302: The terminal adjusts a parameter of an audio service of the terminal if a first condition is met.

The audio service may include services such as an incoming call, calling, music play, and video play. A key parameter of the audio service includes at least one of volume and a sound effect. Adjusting the volume may be adjusting loudness (value) of a sound. Adjusting the sound effect may be adjusting at least one of a proportion of a low-frequency sound, a proportion of an intermediate-frequency sound, and a proportion of a high-frequency sound.

The first condition includes one or more of the following cases: The first battery level is less than a first preset threshold or greater than a second preset threshold, and the first temperature is less than a third preset threshold or greater than a fourth preset threshold.

In a possible design, if the first battery level is less than the first preset threshold, and/or the first temperature is less than the third preset threshold, the terminal switches a working mode of the audio service from a normal mode to a low-power mode. Volume and/or a sound effect of the audio service in the low-power mode are/is lower than volume and/or a sound effect of the audio service in the normal mode. In this way, objectives such as power consumption reduction (battery life extension), current reduction, and speaker protection can be achieved in a low-temperature or low-battery scenario, and power-off or restart is not triggered. If the first battery level is greater than the second preset threshold, and/or the first temperature is greater than the fourth preset threshold, the terminal switches the working mode of the audio service from the low-power mode to the normal mode, so that user experience can be improved. The low-power mode may include a low-battery mode and a low-temperature mode.

It should be noted that the first preset threshold may be the same as the second preset threshold, and/or the first preset threshold is less than the second preset threshold; and the third preset threshold may be the same as the fourth preset threshold, and/or the third preset threshold is less than the fourth preset threshold. When the first preset threshold is less than the second preset threshold, and/or the third preset threshold is less than the fourth preset threshold, this can prevent the terminal from frequently switching the working mode, thereby reducing power consumption of the terminal.

Figure 4:
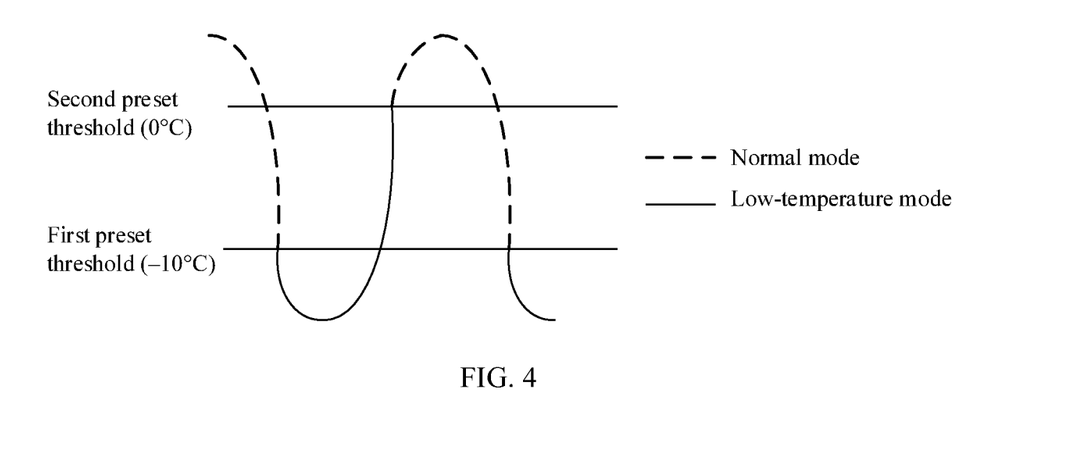
FIG. 4 is a schematic diagram of switching a working mode by a terminal according to an embodiment of this application.

For example, as shown in FIG. 4, it is assumed that the third preset threshold is −10° C., and the fourth preset threshold is 0° C. If the first temperature is less than the third preset threshold, the terminal switches the working mode of the audio service from the normal mode to the low-power mode. If the first temperature is greater than the fourth preset threshold, the terminal switches the working mode of the audio service from the low-power mode to the normal mode. Because the third preset threshold is less than the fourth preset threshold, this can prevent the terminal from frequently switching the working mode, thereby reducing power consumption of the terminal.

A volume curve or a sound effect algorithm parameter that are corresponding to the normal mode of the audio service is different from a volume curve or a sound effect algorithm parameter that are corresponding to the low-power mode of the audio service. Specifically, volume and/or a sound effect of the audio service in the low-power mode are/is less than volume and/or a sound effect of the audio service in the normal mode. That the volume in the low-power mode is less than the volume in the normal mode may be that sound loudness in the low-power mode is lower than sound loudness in the normal mode (for example, the sound loudness in the low-power mode is 80 dB, and the sound loudness in the normal mode is 90 dB). Lower loudness indicates lower power consumption. That the sound effect in the low-power mode is less than the sound effect in the normal mode may be that a proportion of a low-frequency sound in the low-power mode is smaller than a proportion of a low-frequency sound in the normal mode. A smaller proportion of a low-frequency sound indicates lower power consumption.

Figure 5:
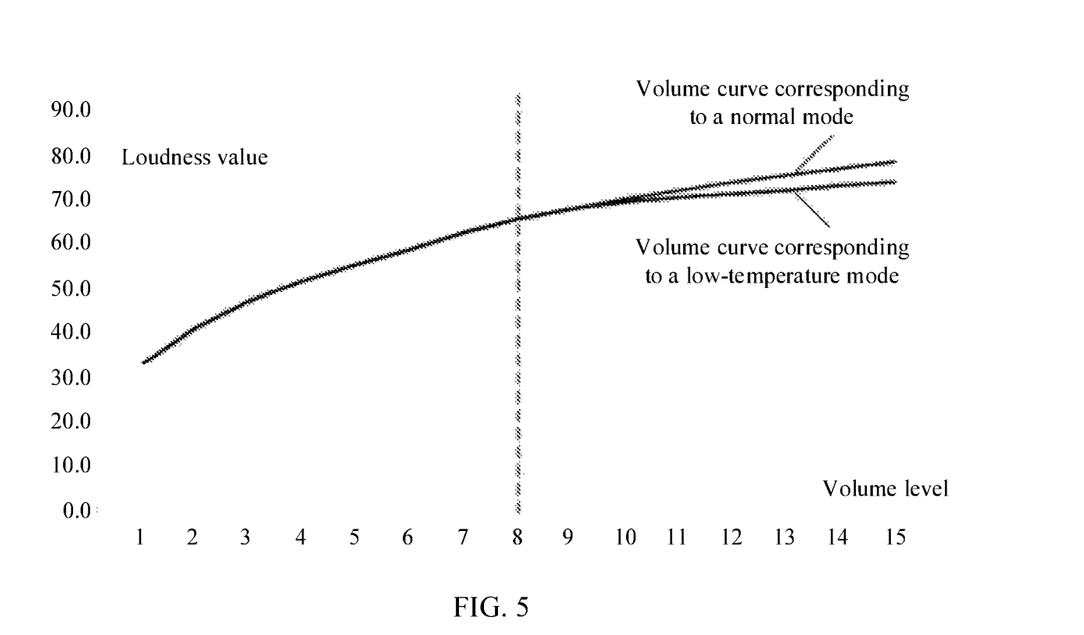
FIG. 5 is a schematic diagram of a volume curve corresponding to a normal mode of an audio service and a volume curve corresponding to a low-temperature mode of the audio service in a low-temperature scenario according to an embodiment of this application.

For example, FIG. 5 is a schematic diagram of a volume curve corresponding to a normal mode of an audio service and a volume curve corresponding to a low-temperature mode of the audio service in a low-temperature scenario. When a volume level is comparatively high, a loudness value of the volume curve corresponding to the low-temperature mode is smaller than that of the volume curve corresponding to the normal mode. Thus objectives such as power consumption reduction (battery life extension), current reduction, and speaker protection are achieved in a low-temperature scenario, and power-off or restart is not triggered.

In a possible design, if the first battery level is less than the first preset threshold, and/or the first temperature is less than the third preset threshold, the terminal performs first processing. The first processing includes at least one of the following: decreasing the volume and reducing the sound effect. Decreasing the volume may be decreasing loudness of a sound. Reducing the sound effect may be reducing a proportion of a low-frequency sound. If the first battery level is less than the first preset threshold, and/or the first temperature is less than the third preset threshold, the following three cases may be included, and the terminal device may decrease the volume and/or reduce the sound effect to different degrees based on different cases.

(1) The first temperature is less than the third preset threshold, and the first battery level is not less than the first preset threshold.

For example, it is assumed that the first preset threshold is 20%, and the third preset threshold is −10° C. If the first battery level is 50%, and the first temperature is −11° C., that is, the first temperature is less than the third preset threshold, and the first battery level is not less than the first preset threshold, the terminal may decrease volume (for example, if current volume is 10 dB, the volume may be decreased to 8 dB), and/or reduce a proportion of a low-frequency sound (for example, if a current proportion of a low-frequency sound is 30%, the proportion of the low-frequency sound may be reduced to 25%).

(2) The first battery level is less than the first preset threshold, and the first temperature is not less than the third preset threshold.

For example, it is assumed that the first preset threshold is 20%, and the third preset threshold is −10° C. If the first battery level is 19%, and the first temperature is −5° C., that is, the first battery level is less than the first preset threshold, and the first temperature is not less than the third preset threshold, the terminal may decrease volume (for example, if current volume is 10 dB, the volume may be decreased to 6 dB), and/or reduce a proportion of a low-frequency sound (for example, if a current proportion of a low-frequency sound is 30%, the proportion of the low-frequency sound may be reduced to 20%).

(3) The first battery level is less than the first preset threshold, and the first temperature is less than the third preset threshold.

For example, it is assumed that the first preset threshold is 20%, and the third preset threshold is −10° C. If the first battery level is 19%, and the first temperature is −11° C., that is, the first battery level is less than the first preset threshold, and the first temperature is less than the third preset threshold, the terminal may decrease volume (for example, if current volume is 10 dB, the volume may be decreased to 5 dB), and/or reduce a proportion of a low-frequency sound (for example, if a current proportion of a low-frequency sound is 30%, the proportion of the low-frequency sound may be reduced to 15%).

In a possible design, if the first battery level is greater than the second preset threshold, and/or the first temperature is greater than the fourth preset threshold, the terminal performs second processing. The second processing includes at least one of the following: increasing the volume and improving the sound effect. Increasing the volume may be increasing loudness of a sound. Improving the sound effect may be increasing a proportion of a low-frequency sound, which can improve user experience.

Based on the solution provided in this embodiment of this application, in a working process of an entire system, the terminal may obtain a battery level and temperature information by monitoring a status of the terminal (for example, in a polling manner) in real time. Based on a specified battery level and specified temperature information (the first preset threshold to the fourth preset threshold), the terminal may proactively adjust the parameter (at least one of the volume and the sound effect) of the audio service or proactively adjust the working mode of the audio service (to be specific, automatically invoke a corresponding volume curve or sound effect algorithm parameter for a different working mode). Therefore, the power-off or restart problem that occurs when the terminal runs the audio service in a low-temperature or low-battery scenario can be resolved.

Figure 6:
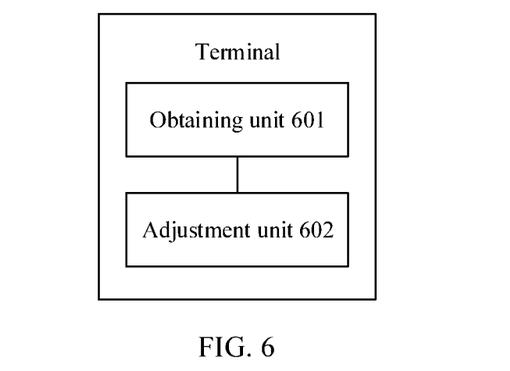
FIG. 6 is a schematic structural diagram of a terminal according to an embodiment of this application.

In some embodiments of this application, the embodiments of this application disclose a terminal. As shown in FIG. 6, the terminal is configured to implement the methods recorded in the foregoing method embodiments, and includes an obtaining unit 601 and an adjustment unit 602. The obtaining unit 601 is configured to support the terminal in performing the process 301 in FIG. 3. The adjustment unit 602 is configured to support the terminal in performing the process 302 in FIG. 3. All related content of the steps in the foregoing method embodiments may be cited in function descriptions of corresponding functional modules, and details are not described herein again.

Figure 7:
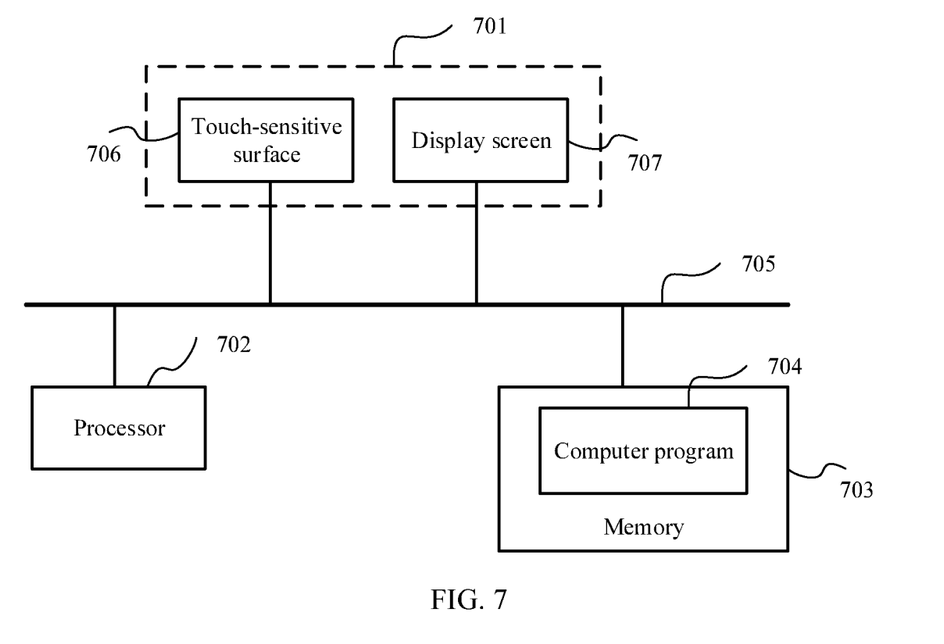
FIG. 7 is a schematic structural diagram of a terminal according to an embodiment of this application.

In some other embodiments of this application, the embodiments of this application disclose a terminal. As shown in FIG. 7, the terminal may include a touchscreen 701, where the touchscreen 701 includes a touch-sensitive surface 706 and a display screen 707, one or more processors 702, a memory 703, one or more application programs (not shown), and one or more computer programs 704. The foregoing devices may be connected by using one or more communications buses 705. The one or more computer programs 704 are stored in the memory 703 and are configured to be executed by the one or more processors 702. The one or more computer programs 704 include an instruction, and the instruction may be configured to perform the steps in FIG. 3 and corresponding embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of the embodiments of this application shall be subject to the protection scope of the claims.

What is claimed is:

1. A method implemented by a terminal, wherein the method comprises:
   obtaining first information comprising at least one of a first battery level or a first temperature; and
   adjusting a parameter of an audio service of the terminal when a first condition is met, wherein the first condition comprises one or more of:
      the first battery level is less than a first preset threshold;
      the first battery level is greater than a second preset threshold;
      the first temperature is less than a third preset threshold; or
      the first temperature is greater than a fourth preset threshold,
   wherein the parameter of the audio service comprises at least one of a volume or a sound effect of the audio service, and wherein, when the parameter is the volume and the first condition comprises the first battery level is less than a first preset threshold, the adjusting a parameter when the first condition is met comprises switching a working mode of the audio service from a normal mode to a low-power mode when the first battery level is less than the first preset threshold,
   wherein the parameter is adjusted according to a volume curve of the low-power mode that is different than that of the normal mode, wherein the volume curve is a curve of a relationship between loudness values and respective volume levels, and
   wherein, when the volume levels are greater than a fifth preset threshold, a loudness value of the volume curve of the low-power mode is smaller than that of the normal mode.

2. The method of claim 1, wherein the volume or the sound effect is for an incoming call, calling, music play, or video play.

3. The method of claim 1, further comprising:
   performing a first processing when the first battery level is less than the first preset threshold or the first temperature is less than the third preset threshold, wherein the first processing comprises at least one of decreasing the volume or reducing the sound effect; and
   performing a second processing when the first battery level is greater than the second preset threshold or the first temperature is greater than the fourth preset threshold, wherein the second processing comprises at least one of increasing the volume or improving the sound effect.

4. The method of claim 1, further comprising:
   switching a working mode of the audio service from a normal mode to a low-power mode when the first battery level is less than the first preset threshold or the first temperature is less than the third preset threshold; and
   switching the working mode from the low-power mode to the normal mode when the first battery level is greater than the second preset threshold or the first temperature is greater than the fourth preset threshold,
   wherein a first volume of the audio service in the low-power mode is less than a second volume of the audio service in the normal mode, and
   wherein a first sound effect of the audio service in the low-power mode is less than a second sound effect of the audio service in the normal mode.

5. The method of claim 1, further comprising performing polling on a battery level of the terminal and temperature information of the terminal.

6. The method of claim 1, further comprising performing polling on a battery level of the terminal.

7. The method of claim 1, further comprising performing polling on temperature information of the terminal.

8. A terminal comprising:
   a memory configured to store instructions; and
   a processor coupled to the memory, wherein the instructions cause the processor to be configured to:
      obtain first information comprising at least one of a first battery level or a first temperature; and
      adjust a parameter of an audio service of the terminal when a first condition is met, wherein the first condition comprises one or more of:
         the first battery level is less than a first preset threshold;
         the first battery level is greater than a second preset threshold;
         the first temperature is less than a third preset threshold; or
         the first temperature is greater than a fourth preset threshold,
      wherein the parameter of the audio service comprises at least one of a volume or a sound effect of the audio service, and wherein, when the parameter is the volume and the first condition comprises the first battery level is less than a first preset threshold, the adjusting a parameter when the first condition is met comprises switching a working mode of the audio service from a normal mode to a low-power mode when the first battery level is less than the first preset threshold,
      wherein the parameter is adjusted according to a volume curve of the low-power mode that is different than that of the normal mode, wherein the volume curve is a curve of a relationship between loudness values and respective volume levels, and wherein, when the volume levels are greater than a fifth preset threshold, a loudness value of the volume curve of the low-power mode is smaller than that of the normal mode.

9. The terminal of claim 8, wherein the instructions further cause the processor to be configured to:

switch a working mode of the audio service from a normal mode to a low-power mode when the first battery level is less than the first preset threshold or the first temperature is less than the third preset threshold; and switch the working mode from the low-power mode to the normal mode when the first battery level is greater than the second preset threshold or the first temperature is greater than the fourth preset threshold, wherein a first volume of the audio service in the low-power mode is less than a second volume of the audio service in the normal mode, and wherein a first sound effect of the audio service in the low-power mode is less than a second sound effect of the audio service in the normal mode.

10. The terminal of claim 8, wherein the volume or the sound effect is for an incoming call, calling, music play, or video play.

11. The terminal of claim 8, wherein the instructions further cause the processor to be configured to:

perform a first processing when the first battery level is less than the first preset threshold or the first temperature is less than the third preset threshold, wherein the first processing comprises at least one of decreasing the volume or reducing the sound effect; and perform a second processing when the first battery level is greater than the second preset threshold or the first temperature is greater than the fourth preset threshold, wherein the second processing comprises at least one of increasing the volume or improving the sound effect.

12. The terminal of claim 8, wherein the instructions further cause the processor to be configured to perform polling on a battery level of the terminal and temperature information of the terminal.

13. The terminal of claim 8, wherein the instructions further cause the processor to be configured to perform polling on a battery level of the terminal.

14. The terminal of claim 8, wherein the instructions further cause the processor to be configured to perform polling on temperature information of the terminal.

15. A computer program product comprising computer-executable instructions stored on a non-transitory computer-readable medium that, when executed by a processor, cause a terminal to:

obtain first information comprising at least one of a first battery level or a first temperature; and adjust a parameter of an audio service of the terminal when a first condition is met, wherein the first condition comprises one or more of:

the first battery level is less than a first preset threshold;
the first battery level is greater than a second preset threshold;
the first temperature is less than a third preset threshold; or
the first temperature is greater than a fourth preset threshold, wherein the parameter of the audio service comprises at least one of a volume or a sound effect of the audio service, and wherein, when the parameter is the volume and the first condition comprises the first battery level is less than a first preset threshold, the adjusting a parameter when the first condition is met comprises switching a working mode of the audio service from a normal mode to a low-power mode when the first battery level is less than the first preset threshold, wherein the parameter is adjusted according to a volume curve of the low-power mode that is different than that of the normal mode, wherein the volume curve is a curve of a relationship between loudness values and respective volume levels, and wherein, when the volume levels are greater than a fifth preset threshold, a loudness value of the volume curve of the low-power mode is smaller than that of the normal mode.

16. The computer program product of claim 15, wherein the computer-executable instructions further cause the terminal to:

switch a working mode of the audio service from a normal mode to a low-power mode when the first battery level is less than the first preset threshold or the first temperature is less than the third preset threshold; and switch the working mode from the low-power mode to the normal mode when the first battery level is greater than the second preset threshold or the first temperature is greater than the fourth preset threshold, wherein a first volume of the audio service in the low-power mode is less than a second volume of the audio service in the normal mode, and wherein a first sound effect of the audio service in the low-power mode is less than a second sound effect of the audio service in the normal mode.

17. The computer program product of claim 15, wherein the volume or the sound effect is for an incoming call, calling, music play, or video play.

18. The computer program product of claim 15, wherein the computer-executable instructions further cause the terminal to:

perform a first processing when the first battery level is less than the first preset threshold or the first temperature is less than the third preset threshold, wherein the first processing comprises at least one of decreasing the volume or reducing the sound effect; and perform a second processing when the first battery level is greater than the second preset threshold or the first temperature is greater than the fourth preset threshold, wherein the second processing comprises at least one of increasing the volume or improving the sound effect.

19. The computer program product of claim 15, wherein the computer-executable instructions further cause the terminal to perform polling on a battery level of the terminal or temperature information of the terminal.

20. The computer program product of claim 15, wherein the computer-executable instructions further cause the terminal to perform polling on a battery level of the terminal and temperature information of the terminal.

* * * * *